US010210247B2

United States Patent
Breedvelt-Schouten et al.

(10) Patent No.: US 10,210,247 B2
(45) Date of Patent: *Feb. 19, 2019

(54) GENERATING WORD CLOUDS

(71) Applicant: International Business Machines Corporation, Armonk, NY (US)

(72) Inventors: Ilse M. Breedvelt-Schouten, Manotick (CA); Joseph A. True, Hudson, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/970,917

(22) Filed: May 4, 2018

(65) Prior Publication Data
US 2018/0232439 A1 Aug. 16, 2018

Related U.S. Application Data

(63) Continuation of application No. 15/655,047, filed on Jul. 20, 2017, now Pat. No. 10,025,852, which is a
(Continued)

(51) Int. Cl.
*G06F 17/30* (2006.01)

(52) U.S. Cl.
CPC .. *G06F 17/30696* (2013.01); *G06F 17/30616* (2013.01); *G06F 17/30675* (2013.01); *G06F 17/30699* (2013.01)

(58) Field of Classification Search
CPC ......... G06F 17/30958; G06F 17/30864; G06F 17/30312; G06F 17/30867;
(Continued)

(56) References Cited

U.S. PATENT DOCUMENTS

| 8,037,066 B2 | 10/2011 | Majko |
| 8,347,231 B2 | 1/2013 | Stephens |

(Continued)

FOREIGN PATENT DOCUMENTS

WO   2015058309 A1   4/2015

OTHER PUBLICATIONS

Burch et al., "RadCloud: Visualizing Multiple Texts with Merged Word Clouds", 2014 18th International Conference on Information Visualisation (IV '14), pp. 108-113, DOI 10.1109/IV.2014.72, © 2014 IEEE.
(Continued)

*Primary Examiner* — Dennis Truong
(74) *Attorney, Agent, or Firm* — Tihon Poltavets

(57) ABSTRACT

A computer-implemented method includes identifying an information resource. The information resource includes text information. The information resource includes a contribution from an entry source. The entry source is associated with a profile. The profile includes at least one profile information item that describes the entry source. The method includes generating a first word cloud. The first word cloud is based on one or more words used within the text information. The first word cloud includes a first plurality of words. The method includes generating a second word cloud. The second word cloud is based on at least one profile information item. The second word cloud includes a second plurality of words.

1 Claim, 5 Drawing Sheets

Related U.S. Application Data continuation of application No. 15/073,709, filed on Mar. 18, 2016.

(58) Field of Classification Search
CPC ......... G06F 17/30035; G06F 17/30598; G06F 17/30525; G06F 17/30554; G06F 17/30696; G06F 17/30991; G06F 17/241; G06F 17/5072; G06F 17/509; G06Q 50/01; H04L 67/306; H04L 67/22; H04L 51/32; H04W 4/21
USPC ........... 707/722, 749, 730, 734, 736; 706/11
See application file for complete search history.

(56) References Cited

U.S. PATENT DOCUMENTS

| | | | | |
|---|---|---|---|---|
| 8,458,193 | B1* | 6/2013 | Procopio | G06F 17/30616 707/749 |
| 8,462,160 | B2* | 6/2013 | Lindsay | G06Q 10/10 345/440 |
| 2008/0059897 | A1* | 3/2008 | Dilorenzo | G06F 17/30719 715/764 |
| 2008/0222105 | A1* | 9/2008 | Matheny | G06F 17/30867 |
| 2009/0144297 | A1* | 6/2009 | Lyle | G06F 17/30867 |
| 2009/0157618 | A1* | 6/2009 | Matheny | G06F 17/3064 |
| 2009/0287989 | A1* | 11/2009 | Chakra | G06F 17/30867 715/205 |
| 2010/0161619 | A1* | 6/2010 | Lamere | G06F 17/3089 707/749 |
| 2011/0040562 | A1* | 2/2011 | Doyle | G11B 27/322 704/251 |
| 2011/0258203 | A1* | 10/2011 | Wouhaybi | H04L 51/32 707/749 |
| 2012/0117463 | A1* | 5/2012 | Inglis | G06F 17/2288 715/255 |
| 2013/0007661 | A1* | 1/2013 | Klappert | G06F 3/0481 715/811 |
| 2013/0159406 | A1* | 6/2013 | Chand | G06Q 10/10 709/204 |
| 2013/0173533 | A1* | 7/2013 | Nichols | G06F 17/30035 707/609 |
| 2013/0212093 | A1* | 8/2013 | Chitiveli | G06F 17/30991 707/730 |
| 2014/0172751 | A1* | 6/2014 | Greenwood | G06Q 40/06 705/36 R |
| 2014/0195531 | A1* | 7/2014 | Diament | G06F 17/30958 707/736 |
| 2014/0236772 | A1* | 8/2014 | McCoy | G06Q 30/0635 705/26.81 |
| 2015/0120713 | A1* | 4/2015 | Kim | G06F 17/3053 707/723 |
| 2016/0070762 | A1* | 3/2016 | Nicholls | G06F 17/30864 707/722 |
| 2016/0092576 | A1* | 3/2016 | Quercia | G06F 17/30867 707/734 |
| 2016/0148108 | A1* | 5/2016 | Jericho | G06N 5/04 706/11 |
| 2016/0171090 | A1* | 6/2016 | Schwartz | G06Q 10/101 707/730 |
| 2017/0147676 | A1* | 5/2017 | Jaidka | G06F 17/30598 |
| 2017/0193073 | A1* | 7/2017 | Tannen | G06F 17/30598 |
| 2017/0270192 | A1 | 9/2017 | Breedvelt-Schouten et al. | |
| 2017/0316087 | A1 | 11/2017 | Breedvelt-Schouten et al. | |

OTHER PUBLICATIONS

Heimerl et al., "Word Cloud Explorer: Text Analytics based on Word Clouds", Institute for Visualization and Interactive Systems (VIS), University of Stuttgart, Germany, 2014 47th Hawaii International Conference on System Science, pp. 1833-1842, DOI 10.1109/HICSS.2014.231, © 2014 IEEE.

Lohmann et al., "ConcentriCloud: Word Cloud Visualization for Multiple Text Documents", Institute for Visualization and Interactive Systems (VIS), University of Stuttgart, Germany, 2015 19th International Conference on Information Visualisation, pp. 114-120, DOI 10.1109/iV.2105.30, © 2015 IEEE.

"Folksonomy-based Keyword Extraction for tag-cloud generation", An IP.com Prior Art Database Technical Disclosure, Authors et. al.: Disclosed Anonymously, IP.com No. IPCOM000200579D, IP.com Electronic Publication Date: Oct. 19, 2010, 27 pages.

"Tag cloud", From Wikipedia, the free encyclopedia, this page was last modified on Sep. 1, 2015, 6 pages, printed on Feb. 17, 2016, <https://en.wikipedia.org/wiki/Tag_cloud>.

IBM, List of IBM Patents or Patent Applications Treated as Related, Appendix P, dated May 8, 2018, 2 pages.

Pending U.S. Appl. No. 15/970,921, filed May 4, 2018, entitled: "Generating Word Clouds".

\* cited by examiner

GENERATING WORD CLOUDS

BACKGROUND

The present invention relates generally to the field of text data, and more particularly to word clouds.

A word cloud, sometimes referred to as a tag cloud or a weighted list in visual design, is a visual representation of text data. Word clouds depict keyword metadata tags from website, visualize form text, and illustrate a prominent term within a text resource. Word clouds typically display words with different font sizes or colors depending on the prominence of a word or a category for the word.

SUMMARY

A computer-implemented method includes identifying an information resource. The information resource includes text information. The information resource includes a contribution from an entry source. The entry source is associated with a profile. The profile includes at least one profile information item that describes the entry source. The method includes generating a first word cloud. The first word cloud is based on one or more words used within the text information. The first word cloud includes a first plurality of words. The method includes generating a second word cloud. The second word cloud is based on the at least one profile information item. The second word cloud includes a second plurality of words.

DETAILED DESCRIPTION

Figure 1:
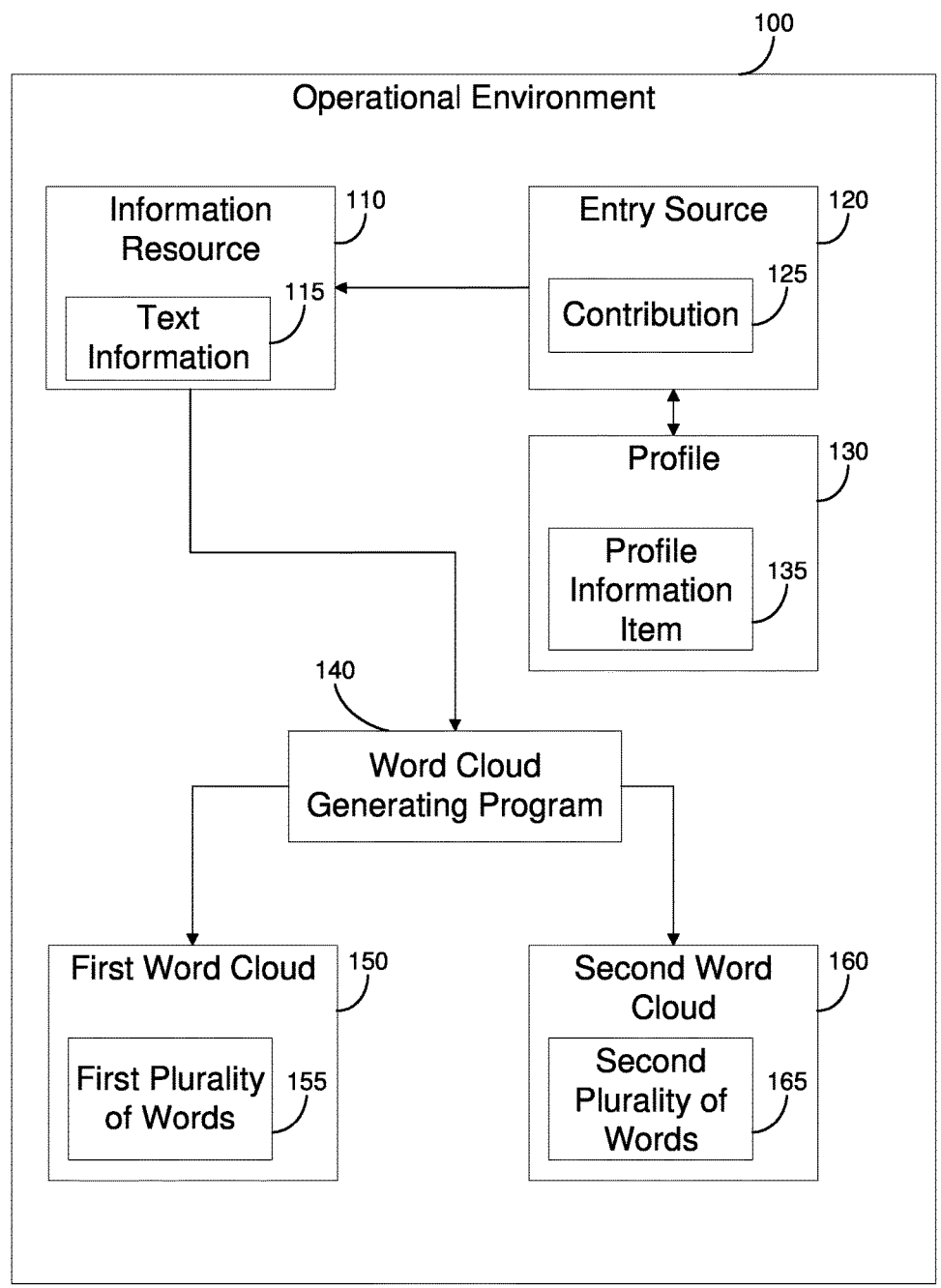
FIG. 1 is a block diagram of an operational environment suitable for operation of a word cloud generating program, in accordance with at least one embodiment of the present invention.

Referring now to the invention in more detail, FIG. 1 is a block diagram displaying an exemplary operational environment suitable for operation of at least one embodiment of the invention. An operational environment 100 includes an information resource 110, which includes text information 115, an entry source 120, which includes a contribution 125, a profile 130, which includes a profile information item 135, and a word cloud generating program 140, all in mutual direct or indirect electronic communication. Data in the system include a first word cloud 150, which includes a first plurality of words 155, and a second word cloud 160, which includes a second plurality of words 165, electronically accessible via the operational environment 100. The operational environment 100 may be a cloud-based, virtual, or distributed environment or a remote environment on defined server hardware, or, more generally, the operational environment 100 may be any type of environment suitable for access by the word cloud generating program 140.

The information resource 110 may include one or more web pages, electronic documents, websites, electronic encyclopedias, blogs, social media systems, as well as non-World-Wide-Web electronic resources such as corpora of email, chat, and SMS messages, offline databases, USENET news, etc. The information resource 110 may include text information 115. The text information 115 may include literal text with or without formatting as well as transcribed text from non-text sources (e.g., sound and video recordings) or optically recognized text from non-electronic sources (e.g., printed or handwritten books, newspapers, documents, manuscripts, stone or clay tablets etc.). The text information 115 may be words, sentences, phrases, and/or paragraphs in one or more extant or extinct human languages that make up all or part of the information resource 110. The text information 115 may include a textual description for non-text information, such as a written or transcribed description of an image, sound recording, video recording, three-dimensional digital model, or general non-human readable data included in or with the information resource 110. The information resource 110 may be accessible to the word cloud generating program 140 via an static or dynamic HTML document which describes the text information 115. The HTML document may be scraped from the information resource 110 and provided to the word cloud generating program 140 via a server program, such as an Apache HTTP Server®.

The entry source 120 is a computing device and/or computing device interface that is responsive to input from a user. Input from a user may be the contribution 125. The contribution 125 is input from a user to add, change, update, or amend the text information 115 within the information resource 110. The entry source 120 may be responsive to input from a user by adding to, updating, deleting, and providing or otherwise contributing to the text information 115 within the information resource 110. For example, the contribution 125 may be a paragraph block of text. The entry source 120 may receive the contribution 125 via a computer keyboard. The entry source 120 may add the paragraph block of text to the information resource 110 to effect changing or creating the text information 115, via the operational environment 100.

The entry source 120 is associated with a profile 130. The profile 130 includes the profile information item 135. The profile information item 135 may include at least one property of the entry source 120 that is selected from a group consisting of age, gender, location, amount of contribution or other metadata that describes the entry source. The profile information item 135 may be metadata describing an entry source associated with the profile 130. The profile 130 may receive the profile information item 135 from a human user. The profile 130 includes information, such as the profile information item 135, which is about the human user. For example, in an embodiment, the information resource 110 is a web blog accessible via a web blog forum. The entry source 120 may be a computing device with access to the web blog forum via the internet. The web blog forum may enable the entry source 120 to create the profile 130. The entry source 120 may respond to user input to create the profile 130 for the web blog forum. In some embodiments, the profile 130 may be created responsive to user activity via the entry source 120. For example, the profile information may include a user's most visited websites, most used applications, purchase history, search history, or browser history. In other embodiments, the entry source 120 may be equipped with a Global Positioning System (GPS) receiver or other geolocating hardware or software module such that the entry source 120 is enabled to generate location information and update the profile 130 to include the location information. The entry source 120 may be responsive to user input and user activity to create the profile 130, including the profile information item 135, via the word cloud generating program 140.

The profile 130 may be, for example, a user profile related to a user or contributor in a web blog forum. In such an example, the profile information item 135 may be of a collection of properties related to the user or contributor.

The word cloud generating program 140 identifies the information resource 110, which includes the text information 115 and corresponds to the entry source 120 and profile 130, as input and generates the first word cloud 150 and the second word could 160 as output.

The first word cloud 150 is a tag cloud or weighted list in visual design. In a tag cloud of weighted list in visual design words used within an information resource, such as the information resource 110 are visually depicted, with words that are more frequently used appearing larger, darker, bolder, or otherwise more pronounced. In an embodiment, the first word cloud 150 is a visual representation of the text information 115. The first word cloud 150 may depict keywords sourced from the text information 115. In an embodiment, the first word cloud 150 may depict words associated with words within the text information 115. For example, the first word cloud 150 may depict topics for the words within the text information 115. A topic may be a subject or means of grouping different words within the text information 115. For example, the text information 115 may include the words 'France,' 'Germany,' and 'Italy.' In such an embodiment a topic for the words may be 'countries' or 'European countries.' The words depicted by the first word cloud 150 are the first plurality of words 155.

The second word cloud 160 is a tag cloud or weighted list in visual design. The second word cloud 160 is a visual representation of the profile information 135. For example, the text information 115 may be the result of a contribution 125 from an entry source 120 where the entry source 120 is associated with a profile 130 including the profile information item 135, where the profile information 135 indicates that a user is twenty-three-years-old, college education, and is a fan of a particular sports team. In such an embodiment, the second word cloud 160 may depict the age twenty three, the word 'college-educated', and/or words identifying the particular sports team. The words depicted by the second word cloud 160 are the second plurality of words 165.

Figure 2:
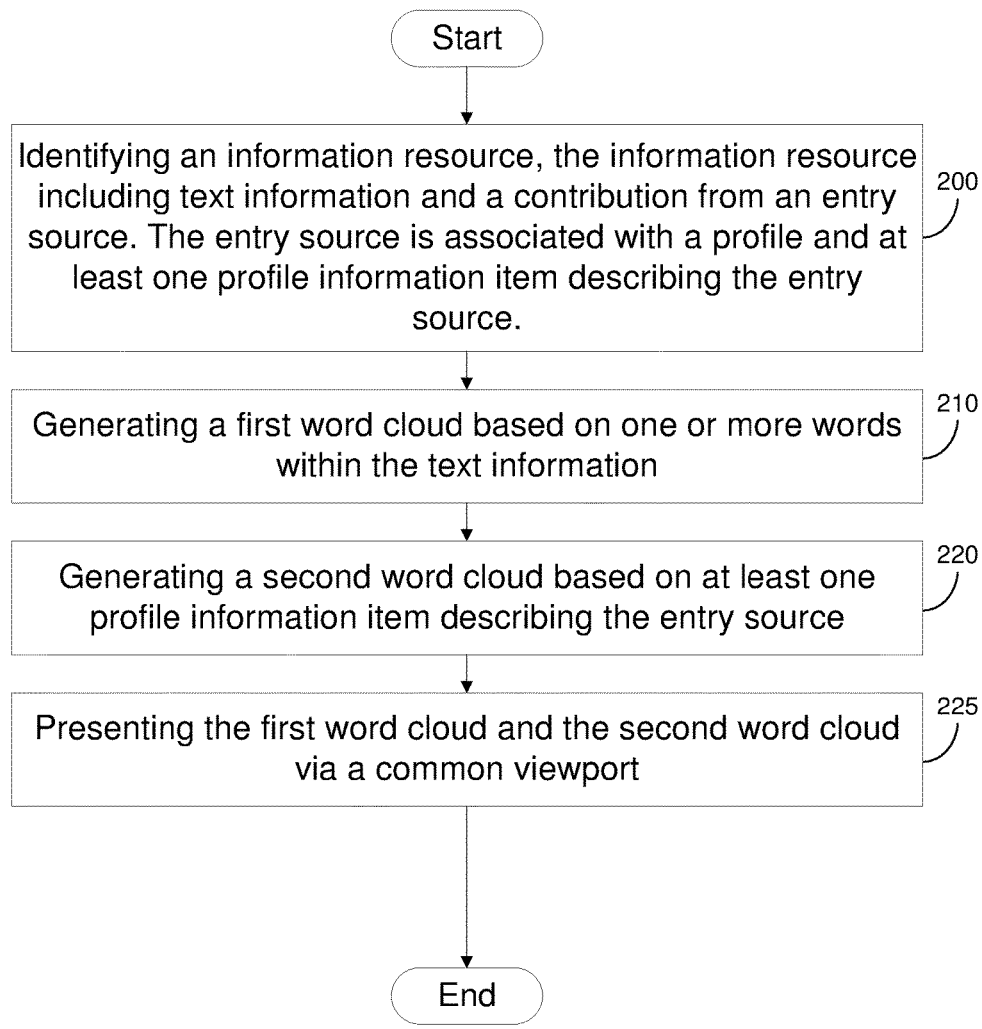
FIG. 2 is a flowchart depicting the operational steps of the word cloud generating program, executing in the context of the operational environment 100 of FIG. 1, in accordance with an embodiment of the present invention.

FIG. 2 is a flowchart depicting the operational steps of the word cloud generating program 140, executing in the context of the operational environment 100 of FIG. 1, in accordance with an embodiment of the present invention.

At step 200, the word cloud generating program 140 identifies the information resource 110. Identifying may include a user explicitly calling the word cloud generating program 140 from a command line interface using a reference to the information resource 110 as an argument. Alternatively, identifying may include automated calls to the word cloud generating program 140, for example, from an integrated development environment or as part of a word cloud generating program management system. The information resource 110 includes the text information 115. The information resource 110 includes a contribution, such as the contribution 125, which is from an entry source, such as the entry source 120. The contribution 125 may be the text information 115. Multiple contributions, such as the contribution 125 may encompass all or a part of the text information 115. The entry source 120 is associated with the profile 130, which includes the profile information item 135.

At step 210, the word cloud generating program 140 generates the first word cloud 150 based on one or more words within the text information 115. Generating may include creating a word count for each unique word used within the text information 115. In some embodiments, generating may include creating a word count for nouns, verbs, adverbs, or a specific part of speech. Generating the first word cloud 150 may include depicting the words such that words that have a higher word count appear larger, bolder, and/or more pronounced than words with a lower word count. Generating the first word cloud 150 may include identifying and depicting the most commonly used words. For example, the word cloud generating program 140 may identify the twenty most commonly used words and depict those most commonly used words within the text information 115.

At step 220, the word cloud generating program 140 generates the second word cloud 160 based on at least one of the profile information item 135. For example, the profile information item 135 may be that a user associated with the entry source 120 has a bachelor's degree in a natural science. In such an example, the second word cloud 160 will include the word 'bachelor's degree in a natural science' as one of the second plurality of words 165. The second word cloud 160 may have words associated with a larger demographic portion appear larger, bolder, and/or more pronounced than words associated with a smaller demographic portion. For example, the second word cloud 160 may reference one hundred profile information items, such as the profile information item 135. Of the one hundred profile information items, 70% may be that users associated with various entry sources, such as the entry source 120 have bachelor's degrees in a natural science, and 30% have a bachelor's degree in a social science. In such an example, the word 'bachelor's degree in a natural science' may be larger, bolder, and/or more pronounced than the word 'bachelor's degree in a social science' in the second word cloud 160.

At step 225, the word cloud generating program 140 presents the first word cloud 150 and the second word cloud 160 via a common viewport. In some embodiments, this enables a human user to simultaneously view the first word cloud 150 and the second word cloud 160. The word cloud generating program 140 may generate a window or region via a client device that is accessible to a user. A common viewport may be a window within a computer display that is capable of displaying both the first word cloud 150 and the second word cloud 160.

Figure 3:
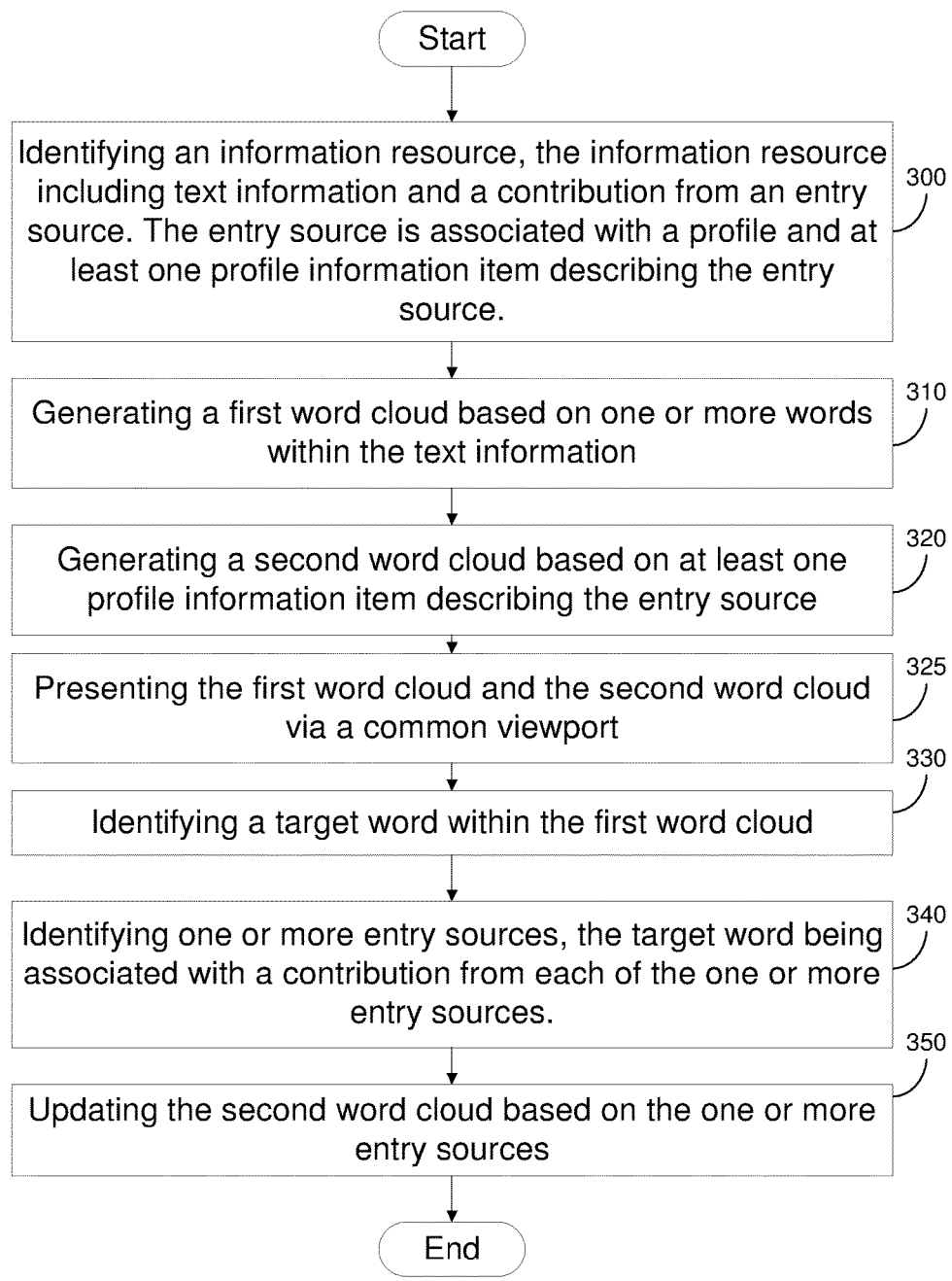
FIG. 3 is a flowchart depicting the operational steps of the word cloud generating program with a target word in a first word cloud, executing in the context of the operational environment of FIG. 1, in accordance with an embodiment of the present invention.

FIG. 3 is a flowchart depicting the operational steps of the word cloud generating program 140 for a target word within the first word cloud, executing in the context of the operational environment 100 of FIG. 1, in accordance with an embodiment of the present invention.

The word cloud generating program 140 performs step 300, step 310, step 320 and step 325, in a manner similar to step 200, step 210, step 220, and step 225.

At step 330, the word cloud generating program 140 identifies one or more target words within the first word cloud 150. The target word is one of the first plurality of words 155. The word cloud generating program 140 may identify the target word, responsive to user input. For example, the word cloud generating program 140 may identify the target word responsive to a user selecting, clicking on, or using a cursor to hover over the target word.

At step 340, the word cloud generating program 140 identifies at least one entry source, such as the entry source 120. The word cloud generating program 140 identifies the entry source 120 based on whether or not the entry source 120 provided a contribution that is associated with the target word. For example, entry source A, entry source B, and entry source C all made contributions to an information resource. Entry source A made contribution D, contribution E, and contribution F. Entry source B made contribution E and contribution F. Entry source C made contribution D. If contribution D is associated with the target word, then the word cloud generating program 140 will identify entry source A and entry source C. In some embodiments, the word cloud generating program 140 may track all contributions associated with a particular entry source.

At step 350, the word cloud generating program 140 updates the second word cloud 160 based on the entry source or entry sources that were identified at step 340. For the previous example, the word cloud generating program 140 would update the second word cloud 160 such that it only included profile information items associated with entry source A and entry source C. This may include the word cloud generating program 140 removing words from the second plurality of words 165 and/or changing how each word within the second plurality of words 165 is displayed. For example, the entry sources identified at step 340 may be mostly fans of a first sports team even though the entry sources associated with the information resource 110 were mostly fans of a second sports team. In such an example, the word 'fan of the first sports team' may appear larger than the word 'fan on the second sports team' within the second word cloud 160 after being updated by the word cloud generating program 140.

Figure 4:
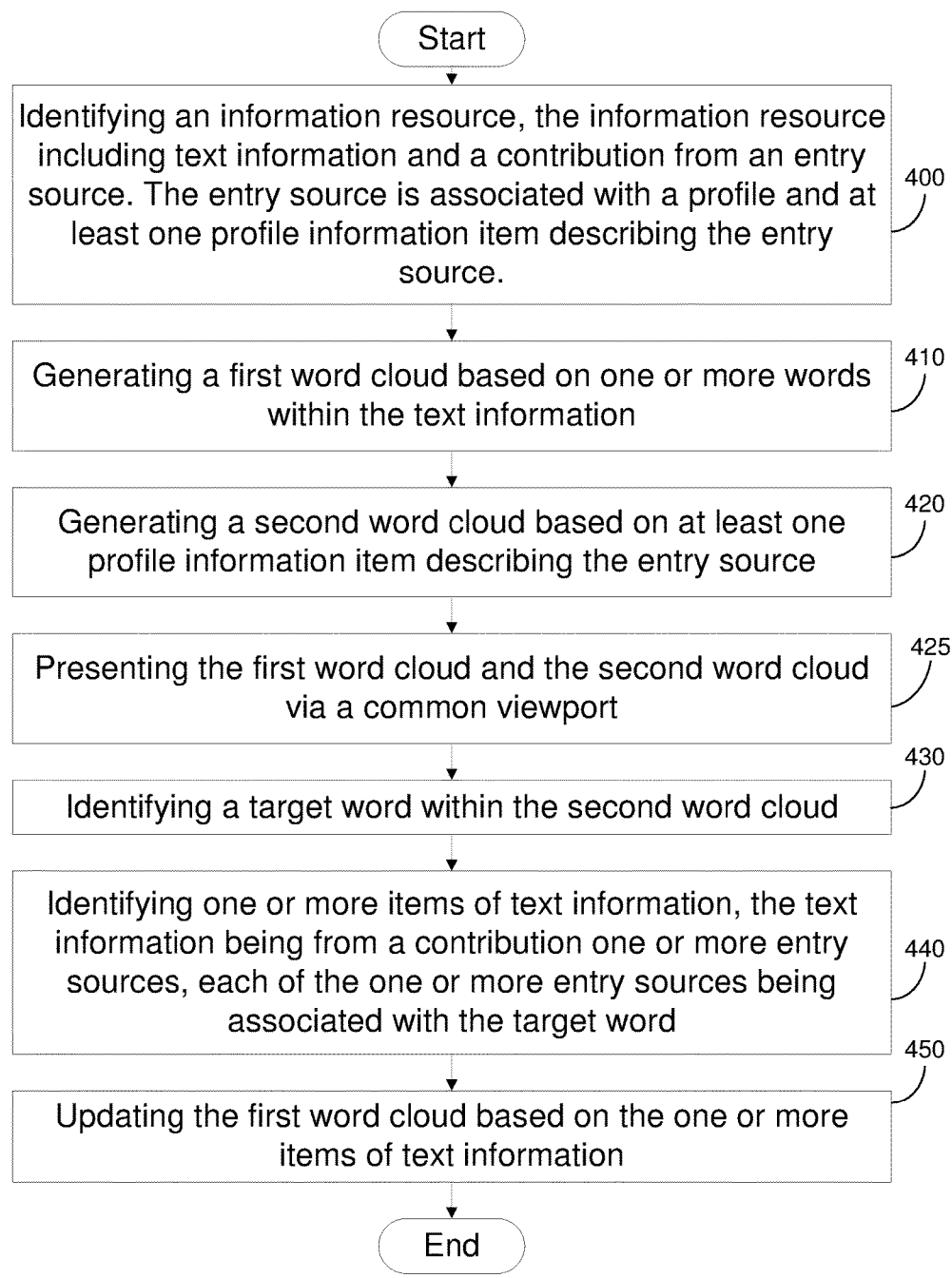
FIG. 4 is a flowchart depicting the operational steps of the word cloud generating program with a target word in a second word cloud, executing in the context of the operational environment of FIG. 1, in accordance with an embodiment of the present invention.

FIG. 4 is a flowchart depicting the operational steps of the word cloud generating program 140 for a target word within the second word cloud 160, executing in the context of the operational environment 100 of FIG. 1, in accordance with an embodiment of the present invention.

The word cloud generating program 140 performs step 400, step 410, step 420, and step 425 in a manner similar to step 200, step 210, step 220, and step 225.

At step 430, the word cloud generating program 140 identifies one or more target words within the second word cloud 160. The target word is one of the second plurality of words 165. The word cloud generating program 140 may identify the target word, responsive to user input. For example, the word cloud generating program 140 may identify the target word responsive to a user selecting, clicking on, or using a cursor to hover over the target word.

At step 440, the word cloud generating program 140 identifies the text information 115 that is a part of the information resource 110 because of a contribution 125 from an entry source 120 associated with the target word identified at step 430. For example, the target word may be the word 'bachelor's degree.' In such an example, the word cloud generating program 140 identifies what text information 115 is associated with a contribution 125 from every entry source associated with a 'bachelor's degree' profile information item.

At step 450, the word cloud generating program 140 updates the first word cloud 150 based on the text information 115 identified at step 440. For the previous example, the word cloud generating program 140 would update the first word cloud 150 to only include words based on the text information 115 associated with contributions from entry sources associated with 'bachelor's degree' profile information items.

Figure 5:
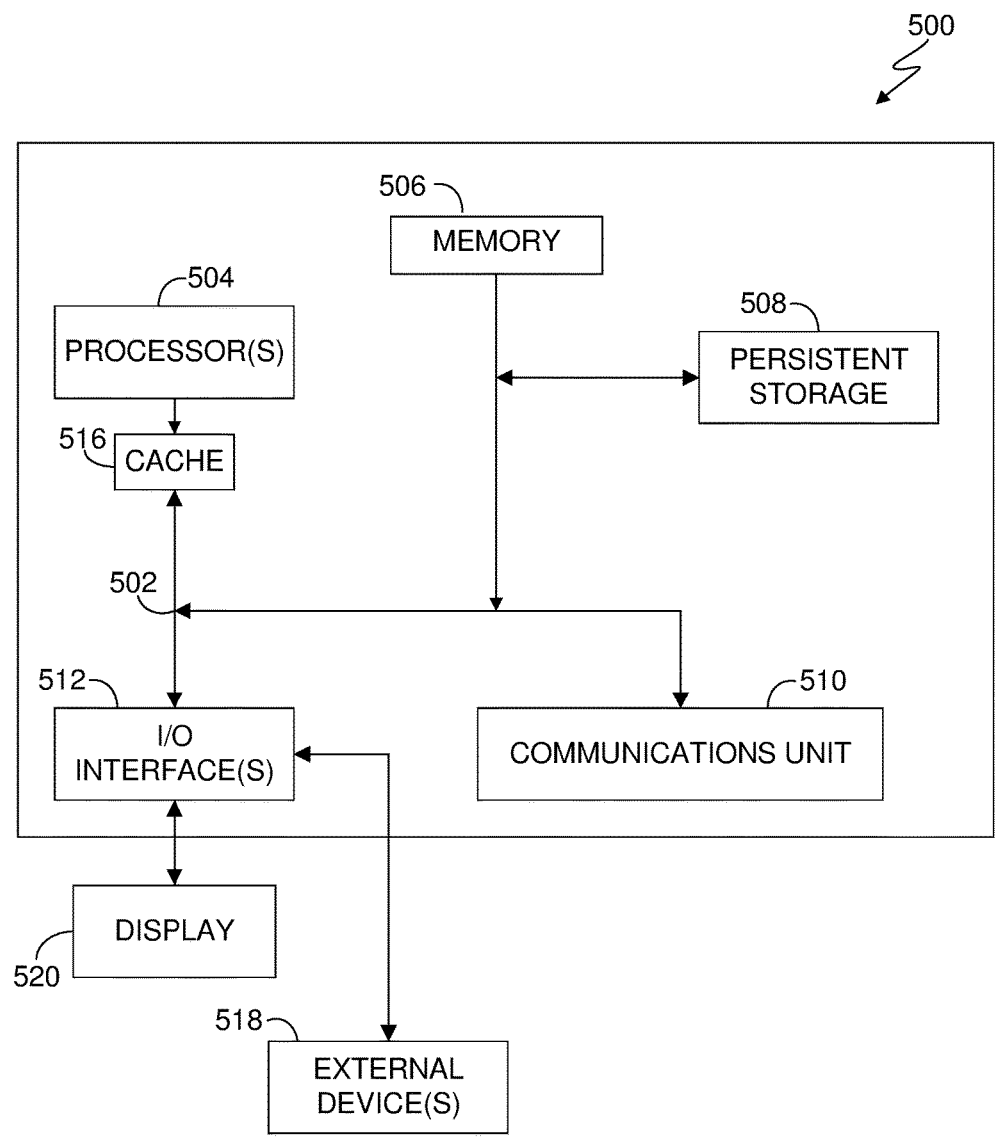
FIG. 5 is a block diagram of components of an operational apparatus suitable for executing the word cloud generating program, in accordance with at least one embodiment of the present invention.

FIG. 5 is a block diagram depicting components of a computer 500 suitable for executing the word cloud generating program 140. FIG. 5 displays the computer 500, the one or more processor(s) 504 (including one or more computer processors), the communications fabric 502, the memory 506, the RAM 516, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g., microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the word cloud generating program 140 may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. word cloud generating program 140 may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising:

one or more computer readable storage devices and program instructions stored on at least one of the one or more storage devices, the program instructions comprising:

program instructions to identify an information resource, said information resource comprising text information, said information resource comprising a contribution from an entry source, said entry source being associated with a profile, said profile comprising a plurality of profile information items that describes said entry source, said plurality of profile information items comprising at least an age, a gender, a location, and an amount of contribution;

program instructions to generate a first word cloud, said first word cloud being based on one or more words used within said text information, said first word cloud comprising a first plurality of words, wherein said first plurality of words is based on a topic, said topic being for said words used within said text information;

program instructions to generate a second word cloud, said second word cloud being based on said plurality of profile information items, said second word cloud comprising a second plurality of words;

program instructions to present said first word cloud and second word cloud via a common viewport;

program instructions to identify a first target word, said first target word being of said first plurality of words:

program instructions to identify one or more entry sources, each of said one or more entry sources being associated with a profile, each of said profile comprising at the plurality of profile information items that describes each of said entry source, said first target word being associated with a contribution from each of said identified entry sources;

program instructions to update said second word cloud based on said identified entry sources;

program instructions to identify a second target word, said second target word being of said second plurality of words:

program instructions to identify one or more items of text information, said text information being of said one or more items of text information, each of said identified items of text information comprising a contribution from one or more entry sources, each of said one or more entry sources being associated with said second target word; and program instructions to update said first word cloud based on said identified items of text information.

* * * * *